United States Patent
Li et al.

(10) Patent No.: US 12,362,894 B2
(45) Date of Patent: Jul. 15, 2025

(54) CARRIER SPECIFIC SCALING FACTOR FOR DEACTIVATED PSCELL

(71) Applicant: Apple Inc., Cupertino, CA (US)

(72) Inventors: Qiming Li, Beijing (CN); Dawei Zhang, Saratoga, CA (US); Huaning Niu, San Jose, CA (US); Jie Cui, San Jose, CA (US); Manasa Raghavan, Sunnyvale, CA (US); Xiang Chen, Campbell, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/759,682

(22) PCT Filed: Aug. 5, 2021

(86) PCT No.: PCT/CN2021/111046
§ 371 (c)(1),
(2) Date: Jul. 28, 2022

(87) PCT Pub. No.: WO2023/010480
PCT Pub. Date: Feb. 9, 2023

(65) Prior Publication Data
US 2024/0187201 A1 Jun. 6, 2024

(51) Int. Cl.
*H04W 24/08* (2009.01)
*H04L 5/00* (2006.01)

(52) U.S. Cl.
CPC .......... *H04L 5/0098* (2013.01); *H04L 5/0035* (2013.01); *H04L 5/0051* (2013.01)

(58) Field of Classification Search
CPC ... H04L 5/0098; H04L 5/0035; H04L 5/0051; H04L 5/001; H04W 24/10; H04W 76/15
See application file for complete search history.

(56) References Cited

U.S. PATENT DOCUMENTS

2019/0230707 A1* 7/2019 Bergljung ............. H04L 5/0053
2019/0306734 A1 10/2019 Huang et al.
(Continued)

FOREIGN PATENT DOCUMENTS

| CN | 111225388 | 6/2020 |
| CN | 111316687 | 6/2020 |

(Continued)

OTHER PUBLICATIONS

Huawei et al., "Discussion on the scaling factor CSSF for multiple SCells", 3GPP TSG-RAN WG4 Meeting #89, R4-1815530, Nov. 11, 2018, 2 sheets.
(Continued)

*Primary Examiner* — Atique Ahmed
(74) *Attorney, Agent, or Firm* — Fay Kaplun & Marcin, LLP (57) ABSTRACT

A user equipment (UE) is configured to simultaneously connect to a primary cell (PCell) serving a primary component carrier (PCC), a primary secondary cell (PSCell) serving a primary secondary component carrier (PSCC) and at least one secondary cell (SCell) serving a secondary component carrier (SCC), wherein the PSCell is in a deactivated state. The UE receives a radio resource management (RRM) measurement configuration comprising a PCC measurement object (MO) configuration, a PSCC MO configuration, and an SCC MO configuration, determines a PCC MO carrier specific scaling factor (CSSF), a PSCC MO CSSF, and an SCC MO CSSF and applies each respective CSSF to a measurement period corresponding to each of the PCC MO, the PSCC MO, and the SCC MO.

20 Claims, 8 Drawing Sheets

Table 500

| Scenario | $CSSF_{outside\_gap,i}$ for FR1 PCC | $CSSF_{outside\_gap,i}$ for FR1 SCC | $CSSF_{outside\_gap,i}$ for FR2 PSCC | $CSSF_{outside\_gap,i}$ for FR2 SCC where neighbour cell measurement is not required | $CSSF_{outside\_gap,i}$ for inter-frequency MO with no measurement gap |
|---|---|---|---|---|---|
| FR1 + FR2 NR-DC (FR1 PCell and FR2 PSCell) Note 1 | $1 + N_{PCC\_CSIRS}$ | $2 \times (N_{SCC\_SSB} + Y + N_{SCC\_CSIRS})$ | $2 \times (N_{SCC\_SSB} + Y + N_{PSCC\_CSIRS})$ Note 2 | $2 \times (N_{SCC\_SSB} + Y + N_{SCC\_CSIRS})$ | $2 \times (N_{SCC\_SSB} + Y + N_{SCC\_CSIRS})$ |

Note 1: NR-DC in Rel-15 only includes the scenarios where all serving cells in MCG in FR1 and all serving cells in SCG in FR2.

Note 2: $CSSF_{outside\_gap,i}$ =1 if no SCell is configured and no inter-frequency MO without gap and only SSB based L3 measurement is configured on PSCC; $CSSF_{outside\_gap,i}$ =2 if no SCell is configured and no inter-frequency MO without gap and either both SSB and CSI-RS based L3 configured or only CSI-RS based L3 measurement is configured on PSCC.

Note 3: Y is the number of configured inter-frequency SSB based frequency layers without MG that are being measured outside of MG for CA capable UE; otherwise, it is 0.

Note 4: $N_{PCC\_CSIRS}$=1 if PCC is with either both SSB and CSI-RS based L3 configured or only CSI-RS based L3 measurement configured; otherwise, $N_{PCC\_CSIRS}$ =0.

Note 5: $N_{PSCC\_CSIRS}$=1 if PSCC is with either both SSB and CSI-RS based L3 configured or only CSI-RS based L3 measurement configured; otherwise, $N_{PSCC\_CSIRS}$ =0.

Note 6: $N_{SCC\_CSIRS}$=Number of configured SCell(s) and PSCell(s) with either both SSB and CSI-RS based L3 measurement configured or only CSI-RS based L3 measurement configured Note 7: Void Note 8: $N_{SCC\_SSB}$=Number of configured SCell(s) and PSCell(s) with only SSB based L3 measurement configured

(56) References Cited

U.S. PATENT DOCUMENTS

| | | | |
|---|---|---|---|
| 2020/0059962 A1* | 2/2020 | Tejedor | H04W 76/14 |
| 2021/0014752 A1* | 1/2021 | Axmon | H04W 36/26 |
| 2021/0105646 A1* | 4/2021 | Siomina | H04W 24/08 |
| 2021/0105760 A1* | 4/2021 | Chen | H04W 72/0446 |
| 2022/0109546 A1* | 4/2022 | Panteleev | H04L 1/1887 |
| 2023/0030224 A1* | 2/2023 | Wang | H04W 24/08 |
| 2023/0276282 A1* | 8/2023 | Li | H04L 27/2613 |
| | | | 370/329 |
| 2023/0388924 A1* | 11/2023 | Kazmi | H04W 52/0229 |
| 2024/0314602 A1* | 9/2024 | Cui | H04W 24/08 |

FOREIGN PATENT DOCUMENTS

| | | |
|---|---|---|
| CN | 112368952 | 2/2021 |
| WO | 2020/088682 | 5/2020 |
| WO | 2020/166018 | 8/2020 |

OTHER PUBLICATIONS

Huawei et al., "Correction to CSSF calculation R16", 3GPP TSG-RAN4 Meeting #97-e, R4-2015446, Oct. 23, 2020, 8 sheets.

Ericsson, "CSSF outside gap for NE-DC operation", 3GPP TSG-RAN WG4 Meeting #90, R4-1900941, Feb. 15, 2019, 3 sheets.

Huawei et al., "Discussion on FR2 measurement outside gap", 3GPP TSG-RAN WG4, Meeting #93, R4-1914900, Nov. 22, 2019, 5 sheets.

* cited by examiner

Table 500

| Scenario | $CSSF_{outside\_gap,i}$ for FR1 PCC | $CSSF_{outside\_gap,i}$ for FR1 SCC | $CSSF_{outside\_gap,i}$ for FR2 PSCC | $CSSF_{outside\_gap,i}$ for FR2 SCC where neighbour cell measurement is not required | $CSSF_{outside\_gap,i}$ for inter-frequency MO with no measurement gap |
|---|---|---|---|---|---|
| FR1 + FR2 NR-DC (FR1 PCell and FR2 PScell) Note 1 | $1+N_{PCC\_CSIRS}$ | $2\times(N_{SCC\_SSB} +Y+N_{SCC\_CSIRS})$ | $2\times(N_{SCC\_SSB} +Y+N_{PSCC\_CSIRS})$ Note 2 | $2\times(N_{SCC\_SSB} +Y+N_{SCC\_CSIRS})$ | $2\times(N_{SCC\_SSB} +Y+N_{SCC\_CSIRS})$ |

Note 1: NR-DC in Rel-15 only includes the scenarios where all serving cells in MCG in FR1 and all serving cells in SCG in FR2.

Note 2: $CSSF_{outside\_gap,i}$ =1 if no SCell is configured and no inter-frequency MO without gap and only SSB based L3 measurement is configured on PSCC; $CSSF_{outside\_gap,i}$ =2 if no SCell is configured and no inter-frequency MO without gap and either both SSB and CSI-RS based L3 configured or only CSI-RS based L3 measurement is configured on PSCC.

Note 3: Y is the number of configured inter-frequency SSB based frequency layers without MG that are being measured outside of MG for CA capable UE; otherwise, it is 0.

Note 4: $N_{PCC\_CSIRS}$=1 if PCC is with either both SSB and CSI-RS based L3 configured or only CSI-RS based L3 measurement configured; otherwise, $N_{PCC\_CSIRS}$ =0.

Note 5: $N_{PSCC\_CSIRS}$=1 if PSCC is with either both SSB and CSI-RS based L3 configured or only CSI-RS based L3 measurement configured; otherwise, $N_{PSCC\_CSIRS}$ =0.

Note 6: $N_{SCC\_CSIRS}$=Number of configured SCell(s) and PSCell(s) with either both SSB and CSI-RS based L3 measurement configured or only CSI-RS based L3 measurement configured Note 7: Void Note 8: $N_{SCC\_SSB}$=Number of configured SCell(s) and PSCell(s) with only SSB based L3 measurement configured

Table 700

| Scenario | $CSSF_{outside\_gap,i}$ for FR1 PCC | $CSSF_{outside\_gap,i}$ for FR1 SCC | $CSSF_{outside\_gap,i}$ for FR2 PSCC | $CSSF_{outside\_gap,i}$ for FR2 SCC where neighbour cell measurement is not required | $CSSF_{outside\_gap,i}$ for inter-frequency MO with no measurement gap |
|---|---|---|---|---|---|
| FR1 + FR2 NR-DC (FR1 PCell and FR2 PSCell) Note 1 | $1+N_{PCC\_CSIRS}$ | $g(R_{PSCC}) \times 2 \times (N_{SCC\_SSB} + Y + 2 \times N_{SCC\_CSIRS})$ | $f(R_{PSCC}) \times 2 \times (1 + N_{PSCC\_CSIRS})$ Note 2 | $g(R_{PSCC}) \times 2 \times (N_{SCC\_SSB} + Y + 2 \times N_{SCC\_CSIRS})$ | $g(R_{PSCC}) \times 2 \times (N_{SCC\_SSB} + Y + 2 \times N_{SCC\_CSIRS})$ |

Note 1: NR-DC in Rel-15 only includes the scenarios where all serving cells in MCG in FR1 and all serving cells in SCG in FR2.

Note 2: $CSSF_{outside\_gap,i} = 1$ if no SCell is configured and no inter-frequency MO without gap and only SSB based L3 measurement is configured on PSCC; $CSSF_{outside\_gap,i} = 2$ if no SCell is configured and no inter-frequency MO without gap and either both SSB and CSI-RS based L3 configured or only CSI-RS based L3 measurement is configured on PSCC.

Note 3: Y is the number of configured inter-frequency SSB based frequency layers without MG that are being measured outside of MG for CA capable UE; otherwise, it is 0.

Note 4: $CSSF_{outside\_gap,i} = 1$ if PCC is with either both SSB and CSI-RS based L3 configured or only CSI-RS based L3 measurement configured; otherwise, $N_{PCC\_CSIRS} = 0$.

Note 5: $N_{PSCC\_CSIRS} = 1$ if PSCC is with either both SSB and CSI-RS based L3 configured or only CSI-RS based L3 measurement configured; otherwise, $N_{PSCC\_CSIRS} = 0$.

Note 6: $N_{SCC\_CSIRS}$ = Number of configured SCell(s) with either both SSB and CSI-RS based L3 measurement configured or only CSI-RS based L3 measurement configured Note 7: Void Note 8: $N_{SCC\_SSB}$ = Number of configured SCell(s) with only SSB based L3 measurement configured

CARRIER SPECIFIC SCALING FACTOR FOR DEACTIVATED PSCELL

TECHNICAL FIELD

This application relates generally to wireless communication, and in particular relates to Carrier Specific Scaling Factor for Deactivated PSCell.

BACKGROUND

Multi-Radio Access Technology (RAT) Dual connectivity (MR-DC) has been used to increase data throughput at a user equipment (UE). In MR-DC, the UE can transmit and receive data on multiple component carriers from two cell groups (including cells from different RATs) to increase the throughput of the UE.

In 5G new radio (NR) DC, component carriers may be in a first frequency range (FR1) or a second frequency range (FR2). Typically, the FR1 frequency range is below 7.225 GHz and the FR2 frequency range is in the mmWave frequency above 24.250 GHz. When communicating with the 5G network, the UE may be configured with one or more bandwidth parts (BWPs) of FR1 and/or FR2 on which to communicate.

SUMMARY

Some exemplary embodiments are related to a user equipment (UE) having a transceiver configured to simultaneously connect to a primary cell (PCell) serving a primary component carrier (PCC), a primary secondary cell (PSCell) serving a primary secondary component carrier (PSCC) and at least one secondary cell (SCell) serving a secondary component carrier (SCC), wherein the PSCell is in a deactivated state and a processor communicatively coupled to the transceiver and configured to perform operations. The operations include receiving a radio resource management (RRM) measurement configuration comprising a PCC measurement object (MO) configuration, a PSCC MO configuration, and an SCC MO configuration, determining a PCC MO carrier specific scaling factor (CSSF), a PSCC MO CSSF, and an SCC MO CSSF and applying each respective CSSF to a measurement period corresponding to each of the PCC MO, the PSCC MO, and the SCC MO.

Other exemplary embodiments are related to a processor of a user equipment (UE), wherein the UE is configured to simultaneously connect to a primary cell (PCell) serving a primary component carrier (PCC), a primary secondary cell (PSCell) serving a primary secondary component carrier (PSCC) and at least one secondary cell (SCell) serving a secondary component carrier (SCC), wherein the PSCell is in a deactivated state, the processor is configured to perform operations. The operations include receiving a radio resource management (RRM) measurement configuration comprising a PCC measurement object (MO) configuration, a PSCC MO configuration, and an SCC MO configuration, determining a PCC MO carrier specific scaling factor (CSSF), a PSCC MO CSSF, and an SCC MO CSSF and applying each respective CSSF to a measurement period corresponding to each of the PCC MO, the PSCC MO, and the SCC MO.

Still further exemplary embodiments are related to a base station having a transceiver configured to communicate with a user equipment (UE) that is simultaneously connected to a primary cell (PCell) serving a primary component carrier (PCC), a primary secondary cell (PSCell) serving a primary secondary component carrier (PSCC) and at least one secondary cell (SCell) serving a secondary component carrier (SCC), wherein the PSCell is in a deactivated state and a processor communicatively coupled to the transceiver and configured to perform operations. The operations include transmitting, to the UE, a radio resource management (RRM) measurement configuration comprising a PCC measurement object (MO) configuration, a PSCC MO configuration, and an SCC MO configuration, wherein the RRM measurement configuration includes information allowing the UE to determine a PCC MO carrier specific scaling factor (CSSF), a PSCC MO CSSF, and an SCC MO CSSF.

Additional exemplary embodiments are related to a processor of a base station, wherein the base station is configured to communicate with a user equipment (UE) that is simultaneously connected to a primary cell (PCell) serving a primary component carrier (PCC), a primary secondary cell (PSCell) serving a primary secondary component carrier (PSCC) and at least one secondary cell (SCell) serving a secondary component carrier (SCC), wherein the PSCell is in a deactivated state, the processor is configured to perform operations. The operations include transmitting, to the UE, a radio resource management (RRM) measurement configuration comprising a PCC measurement object (MO) configuration, a PSCC MO configuration, and an SCC MO configuration, wherein the RRM measurement configuration includes information allowing the UE to determine a PCC MO carrier specific scaling factor (CSSF), a PSCC MO CSSF, and an SCC MO CSSF.

BRIEF DESCRIPTION OF THE DRAWINGS

FIG. 5 shows a table for determining a carrier specific scaling factor (CSSF) for deactivated serving cells where a second searcher is allocated evenly among the serving cells according to various exemplary embodiments.

FIG. 7 shows a table for determining a CSSF for deactivated serving cells where a second searcher is allocated based on a prioritization of a primary secondary cell (PSCell) according to various exemplary embodiments.

DETAILED DESCRIPTION

The exemplary embodiments may be further understood with reference to the following description and the related appended drawings, wherein like elements are provided with the same reference numerals. The exemplary embodiments relate to a carrier specific scaling factor (CSSF) to be used for deactivated primary secondary cells (PSCells).

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio NR radio access technology (RAT). However, in some embodiments, the network may also include a Long-Term Evolution (LTE) RAT and legacy RATs (e.g., CDMA, 3G, etc.). While the exemplary embodiments are described with reference to a 5G NR RAT, those skilled in the art will understand that other RATs may serve some of the component carriers (CCs) in an MR-DC arrangement.

In MR-DC, the UE may be configured with a primary cell group (PCG) and a secondary cell group (SCG). The PCG may include a primary cell (PCell) and one or more secondary cells (SCells) for communication between the UE and the 5G wireless network. The PCell serves a primary component carrier (PCC) and the SCells serve one or more secondary component carriers (SCCs). In addition, the SCG may include a primary secondary cell (PSCell) and one or more SCells for communication between the UE and the 5G wireless network. The PSCell serves a primary secondary component carrier (PSCC) and the SCells serve one or more SCCs. Because the UE only has a limited number of searchers (e.g., radiofrequency and baseband processing resources), the UE cannot simultaneously perform measurements on measurement objects (MOs) of all configured CCs during every monitoring occasion. These MOs may include synchronization signal block (SSBs), channel state information reference signals (CSI-RS), etc.

In Release 17 of the Third Generation Partnership (3GPP) standards, it is anticipated that the PSCell in the SCG will be allowed to be deactivated to provide energy saving at both the UE and network. However, the UE behavior in a deactivated PSCell needs to be defined. For example, when the PSCell is deactivated, the UE may not perform any Physical Downlink Control Channel (PDCCH) monitoring, Physical Downlink Shared Channel (PDSCH) reception, Physical Uplink Shared Channel (PUSCH) transmissions, beam management, etc.

In addition, Radio Resource Management (RRM) measurements on a deactivated serving cell (e.g., PSCell) may also be relaxed. Currently, there exists relaxed RRM measurements for a deactivated SCell compared with active serving cells. However, it is unlikely that the same measurement table can be used for measurement of a deactivated PSCell because the carrier specific scaling factor (CSSF) design for a PSCell and an SCell are quite different. PSCell measurements are prioritized over SCell measurements. If the same table is used, the same power saving cannot be achieved for the PSCell as that for the SCell.

According to some exemplary embodiments, the UE is configured to utilize a carrier specific scaling factor (CSSF) that allows searchers to be split equally among all the deactivated serving cells, including SCells and PSCells. For example, if the UE has two searchers, one searcher may be dedicated to measuring MOs of the PCC while the second searcher is divided among measurements of MOs of the PSCC and any configured SCCs.

In other exemplary embodiments, a new signaling may be introduced to allow prioritization of PSCell measurements over SCell measurements. For example, the PSCC may have a higher priority to the searcher that is used for the PSCC and SCCs. Each of these exemplary embodiments will be described in greater detail below.

Figure 1:
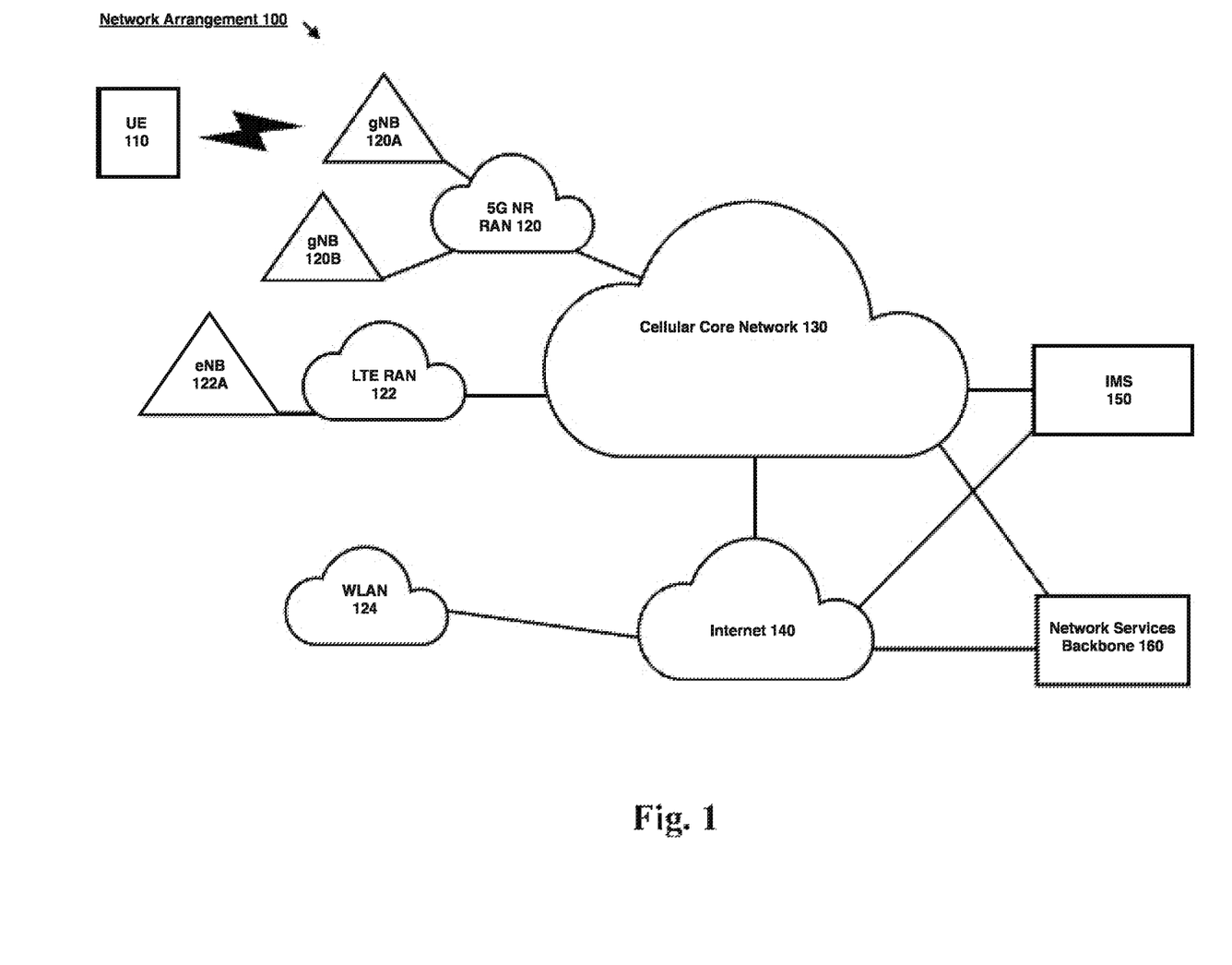
FIG. 1 shows an exemplary network arrangement according to various exemplary embodiments.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UE being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Thus, either simultaneously or alternatively, the UE 110 may connect to the 5G NR-RAN 120 via the gNBs 120A and 120B. In the present example, it may be considered that the gNB 120A is part of a PCG and the gNB 120B is part of SCG. Thus, in DC operation, the UE 110 may be simultaneously connected to gNB 120 A (PCG) and gNB 120B (SCG). In this example, it may be considered that the gNB 120A is the PCell and the gNB 120B is the PSCell. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120 and 122 the network arrangement 100 also includes a cellular core network 130. The cellular core network 130 may be considered to be the interconnected set of components that manages the operation and traffic of the cellular network.

Figure 2:
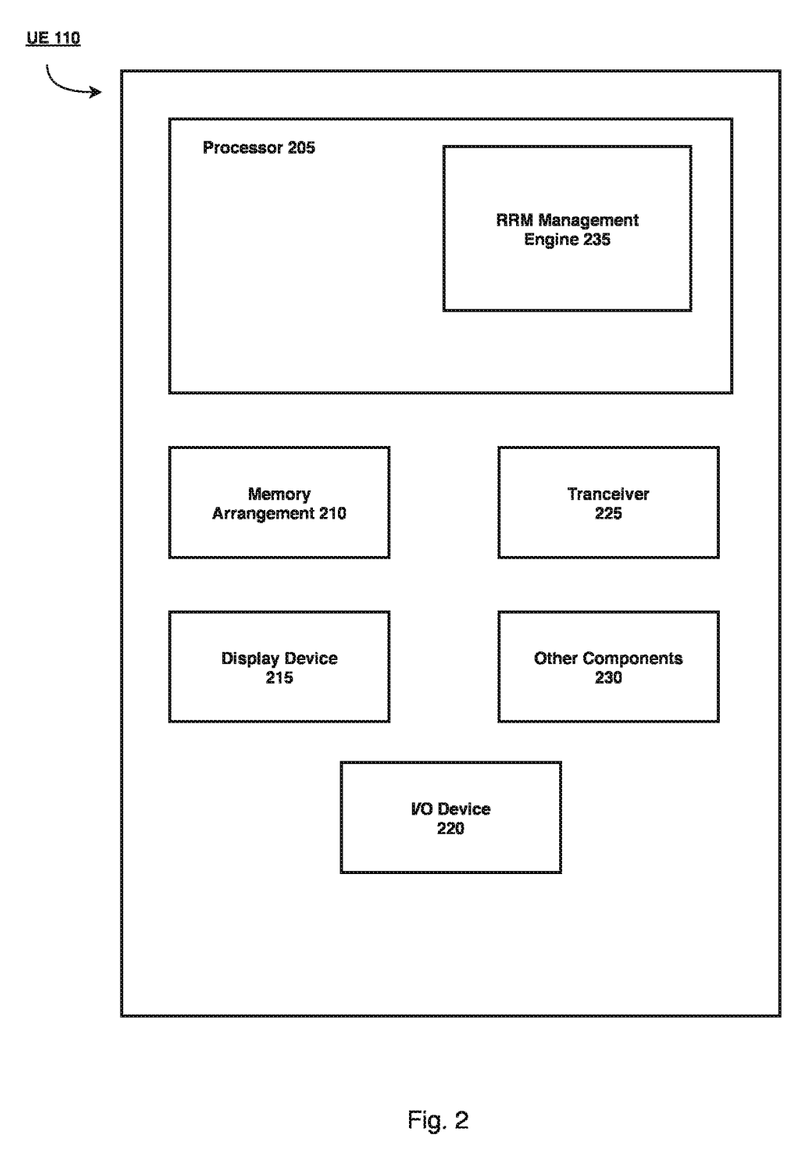
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a radio resource management (RRM) engine 235. The RRM engine 235 may perform various operations related to management of measurements of multiple configured MOs for a deactivated PSCell.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
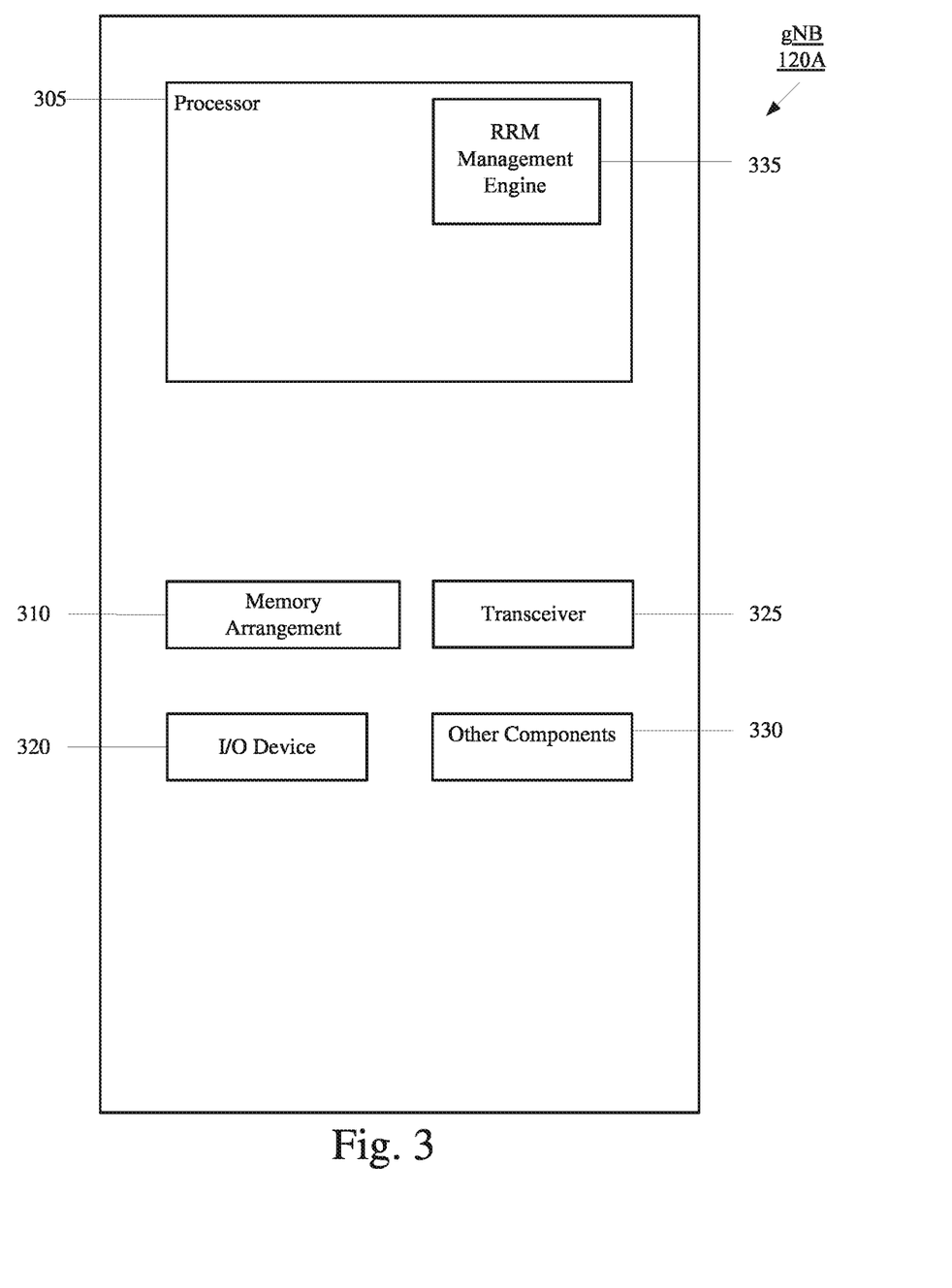
FIG. 3 shows an exemplary network base station according to various exemplary embodiments.

FIG. 3 shows an exemplary network base station according to various exemplary aspects. As noted above with regard to the network arrangement 100 of FIG. 1, in this example, the gNB 120A may represent the PCell of the PCG and the gNB 120B may represent the PSCell for the SCG. The gNB 120A may represent any access node of the 5G NR network through which the UE 110 may establish a connection and manage network operations as a PCell. The gNB 120A illustrated in FIG. 3 may also represent the gNB 120B. In this example, it will be assumed that the control information that is sent to the UE 110 to configure the UE 110 for RRM measurements on a deactivated PSCell is sent by the PCell (e.g., gNB 120A). However, it should be understood that any gNB of the network may send the configuration information to the UE 110.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a radio resource management (RRM) engine 335. The RRM engine 335 may perform various operations related to management of measurements of multiple configured MOs. Specifically, as described above, the RRM engine 335 may configure the UE to perform RRM measurements on a deactivated PSCell. Examples of these operations will be described in greater detail below.

The above noted engines each being an application (e.g., a program) executed by the processor 305 is only exemplary. The functionality associated with the engines may also be represented as a separate incorporated component of the gNB 120B or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
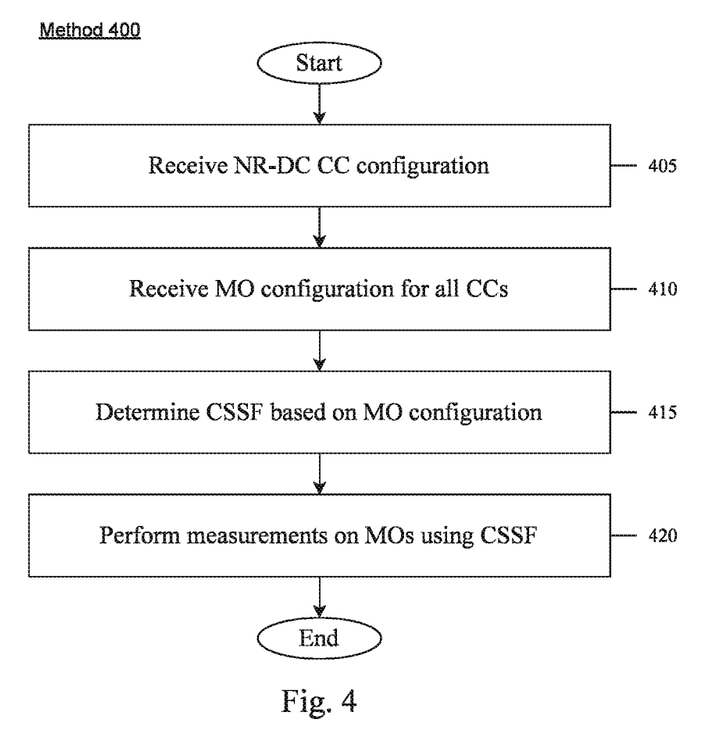
FIG. 4 shows a method of performing radio resource management (RRM) measurements according to various exemplary embodiments.

FIG. 4 shows a method 400 of performing radio resource management (RRM) according to various exemplary embodiments. At 405, the UE 110 receives a CC configuration for NR-DC communications from a gNB (e.g., gNB 120A or 120B). As described above, the CC configuration may include a PCC served by a PCell and a PSCC served by a PSCell. The PCC and the PSCC may be in FR1 and/or FR2, although typically the PCC will be in FR1. The CC configuration may additionally include SCCs from the PCG and/or the SCG. At 410, the UE 110 receives an MO configuration for the CCs configured at 405. As noted above, the UE 110 cannot measure all MOs corresponding to the configured CCs simultaneously. As such, at 415, the UE 110 determines a CSSF based on the MO configuration. This CSSF is determined based on Tables 500 and 700 illustrated in FIGS. 5 and 7, respectively. The CSSF dictates which CC's MO the UE 110 will measure at a given time. In other words, the CSSF is a scaling factor applied to the measurement period of the corresponding MO.

Those skilled in the art will understand that the method 400 is only exemplary and the operations described for the method 400 may be performed in another order. For example, in some exemplary embodiments, the operations 405 and 410 may be reversed.

FIG. 5 shows a table for determining a carrier specific scaling factor (CSSF) for deactivated serving cells where a second searcher is allocated evenly among the serving cells according to various exemplary embodiments. The table 500 allows the searchers to be split equally among all the deactivated serving cells, including SCell and PSCell. The table 500 assumes that the PCC is in FR1 (below 7.225 GHz) and the PSCC is in FR2 (above 24.250 GHz).

The CSSF outside of the measurement gap (MG) for the FR1 PCC is equal to the number of MOs configured for the PCC, which is $1+N_{PCC\_CSIRS}$. As noted in Note 4, if no CSI-RS MO is configured for the PCC, then the CSSF outside of the measurement gap for the FR1 PCC is equal to 1. Otherwise, it is equal to 2 (1+1). The CSSF of the FR1 PCC is always at least one because, as noted above, one of the searchers of the UE 110 is always dedicated to measuring the MOs of the PCC. As also noted in Note 3, $N_{PCC\_CSIRS}$ is equal to 1 if either the SSB and CSI-RS based layer 3 (L3) measurements are both configured for the PCC or if only the CSI-RS based L3 measurement is configured for the PCC (since an SSB is needed to schedule the CSI-RS).

As described above, in some exemplary embodiments, the second searcher of the UE 110 is split equally among the PSCC and any SCCs. The CSSF outside of the measurement gap for the FR2 PSCC is defined as 2×(the number of MOs on the PSCC and on the inter-frequency layer without measurement gap), which is described by the equation $2 \times (N_{SCC\_SSB}+Y+N_{PSCC\_CSIRS})$, where Y is the number of configured inter-frequency SSB-based frequency layers without measurement gap that are being measured outside of the measurement gap (as indicated in Note 3). Note 5 is similar to Note 4 discussed above with the exception that Note 4 pertains to $N_{PSCC\_CSIRS}$. Note 2 indicates that if no SCCs are configured and no inter-frequency MO without measurement gap is configured, then the CSSF outside of the measurement gap for the FR2 PSCC is equal to 1. This means that there are no other MOs that need to share the UE's second searcher with the PSCC. In this case, the first searcher is dedicated to the PCC MOs and the second searcher is used to measure PSCC MOs.

The CSSF outside of the measurement gap for configured SCCs in FR1 is defined as 2×(the number of MOs on all SCCs and on the inter-frequency layer without measurement gap) on any SCC, which is described by the equation $2 \times (N_{SCC\_SBB}+Y+N_{SCC\_CSIRS})$, where Y has been defined above. As indicated in Note 6, $N_{SCC\_CSIRS}$ is the number of configured SCells and PSCells with either (a) both SSB and CSI-RS based L3 measurements configured or (b) only a CSI-RS based L3 measurement configured. As indicated in Note 8, $N_{SCC\_SSB}$ is the number of configured SCells and PSCells with only an SSB based L3 measurement configured.

As can be seen from table 500, the equations for the CSSF outside of the measurement gap for FR2 for configured SCCs where neighbor cell measurement is not required and the CSSF outside of the measurement gap for inter-frequency MOs with no measurement gaps are identical to the CSSF outside of the measurement gap for configured SCCs in FR1 as described above. Thus, as can be seen from the table 500, the searchers are split equally among all the deactivated serving cells.

Figure 6:
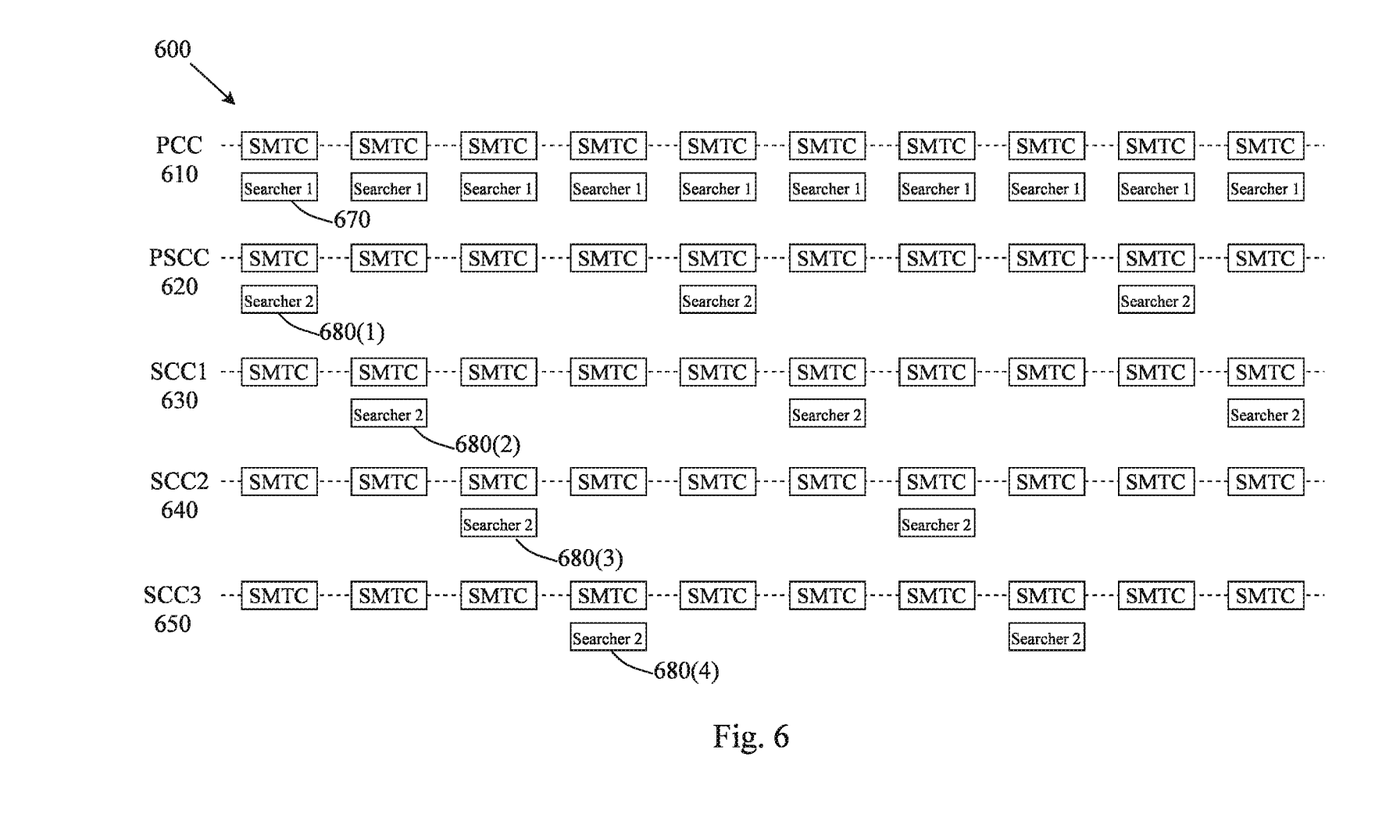
FIG. 6 shows an exemplary searcher allocation when the searchers are split equally among all the deactivated serving cells according to various exemplary embodiments.

FIG. 6 shows an exemplary searcher allocation 600 when the searchers are split equally among all the deactivated serving cells according to various exemplary embodiments. The searcher allocation 600 is based on the table 500 of FIG. 5. In this example, it may be considered that the UE 110 is configured with a PCC 610, a PSCC 620, and three SCCs 630-650. The UE 110 is also configured with the timing of SSBs using a SS/PBCH Block Measurement Timing Configuration (SMTC) for each CC. In this example, each CC is shown as including ten (10) SMTCs. In this example, each SMTC for each CC is shown as having the same time and periodicity for convenience in illustration. Those skilled in the art will understand that typically the SMTC periodicity on the SCCs 630-650 is longer than the PCC 610 and the PSCC 620. Thus, with less measurement on PSCC 620, the UE 110 may experience power saving on the SMTC occasion on the PSCC 620 when there is no overlapped SMTC on the SCCs 630-650.

As described above, a first searcher (searcher 1 670) is dedicated to the PCC 610. Thus, searcher 1 670 is used for all SMTC occasions for the PCC 610 as shown in FIG. 6.

In contrast, a second searcher (searcher 2 680) is split among the PSCC 620 and the SCCs 630-650. As described above, the table 500 results in a CSSF where the searcher 2 680 is split equally among all the deactivated serving cells, e.g., PSCC 620 and SCCs 630-650. Thus, the first instance of searcher 2 680(1) is for the PSCC 620, the second instance of the searcher 2 680(2) is for the SCC 630, the third instance of the searcher 2 680(3) is for the SCC 640, and the fourth instance of the searcher 2 680(4) is for the SCC 650. The searcher 2 680 will then cycle through the PSCC 620 and the SCCs 630-650 equally as shown in FIG. 6. As described above, the timing and periodicity of the SMTCs for the PSCC 620 and the SCCs 630-650 may vary and therefore, the power saving may be increased because the UE 110 may spend less time measuring deactivated cells.

In other exemplary embodiments, new signaling may be introduced to allow prioritization of PSCell measurements over SCell measurements. The signaling may be radio resource control (RRC) signaling, Medium Access Control Control Element (MAC-CE) signaling, etc. The prioritization may be based on an allocation of the second searcher to the PSCell. For example, $R_{PSCC}$ may represent the ratio of the second searcher allocation for PSCell and SCells. The prioritization factor for the allocation may be any value between 0 and 1 (e.g., 0%-100%). The following examples will assume the value of 0.5 (or 50%). However, as stated above, the allocation may take on any value and those skilled in the art will understand how to apply the allocation based on the below examples.

FIG. 7 shows a table 700 for determining a CSSF for deactivated serving cells where a second searcher is allocated based on a prioritization of a PSCell according to various exemplary embodiments. The table 700 allows the second searcher to be allocated based on an allocation that may prioritize the deactivated PSCell over SCells. Again, the table 700 assumes that the PCC is in FR1 (below 7.225 GHz) and the PSCC is in FR2 (above 24.250 GHz).

As described above with respect to table 500, the CSSF outside of the measurement gap (MG) for the FR1 PCC is equal to the number of MOs configured for the PCC, which is $1+N_{PCC\_CSIRS}$. Thus, the allocation for the PCC is the same as was described above and will not be described again.

The CSSF outside of the measurement gap for the FR2 PSCC is described by the equation $f(R_{PSCC}) \times (2 \times (N_{SCC\_SSB}+Y+2 \times N_{PSCC\_CSIRS}))$, where $f(R_{PSCC})$ is a function based on the ratio of the second searcher allocation to the PSCC. Examples of this function will be provided below.

The remaining parameters in the equation were described above with reference to table 500 and will not be described again.

The CSSF outside of the measurement gap for configured SCCs in FR1 is described by the equation $g(R_{PSCC}) \times 2 \times (N_{SCC\_SSB}+Y+N_{SCC\_CSIRS})$, where $g(R_{PSCC})$ is a function based on the ratio of the second searcher allocation to the PSCC. The remaining parameters in the equation were described above with reference to table 500 and will not be described again.

As can be seen from table 700, the equations for the CSSF outside of the measurement gap for FR2 for configured SCCs where neighbor cell measurement is not required and the CSSF outside of the measurement gap for inter-frequency MOs with no measurement gaps are identical to the CSSF outside of the measurement gap for configured SCCs in FR1 as described above.

As shown in table 700, the functions $f(R_{PSCC})$ and $g(R_{PSCC})$ are used to determine the scaling factor CSSF for SCCs and a deactivated PSCC, based on the configured ratio $R_{PSCC}$. The following provides examples of the functions based on the prioritization factor being 50%. In a first example, $f(R_{PSCC})=0.5/R_{PSCC}$ and $g(R_{PSCC})=0.5/(1-R_{PSCC})$. Thus, the scaling factors will allocate 50% of the second searcher to the PSCC and the remaining 50% to the SCCs.

In a second example, it is understood that based on the number of PSCCs and SCCs, the functions may result in a non-integer value. Thus, in the second example, the scale is based on a 50% prioritization factor and then a ceil function to an integer value as follows: $f(R_{PSCC})=\text{ceil}(0.5/R_{PSCC})$ and $g(R_{PSCC})=\text{ceil}(0.5/(1-R_{PSCC}))$.

In a third example, the scale is based on a 50% prioritization factor and then a ceil function of the entire CSSF equation to an integer value. For example, for the PSCC, the equation is: $CSSF_{PSCC}=\text{ceil}(f(R_{PSCC})\times 2\times(1+N_{PSCC\_CSIRS}))=\text{ceil}((0.5/R_{PSCC})\times 2\times(1+N_{PSCC\_CSIRS}))$.

The actual format of the CSSF in the table 700 may be any mathematical transformation of above equation. For example, for the PSCC: $\text{ceil}((0.5/R_{PSCC})\times 2\times(1+N_{PSCC\_CSIRS}))=\text{ceil}(R_{PSCC}\times(1+N_{PSCC\_CSIRS}))$; then $f(R_{PSCC})=R_{PSCC}$. The physical meaning of the CSSF assumption of the UE measurement behavior (e.g., the measurement time and the periodicity) remains the same as was described above. Thus, from these examples it may be seen how to generate the CSSF for other cases, e.g., for a PSCC allocation of 25%, 75%, etc.

Figure 8:
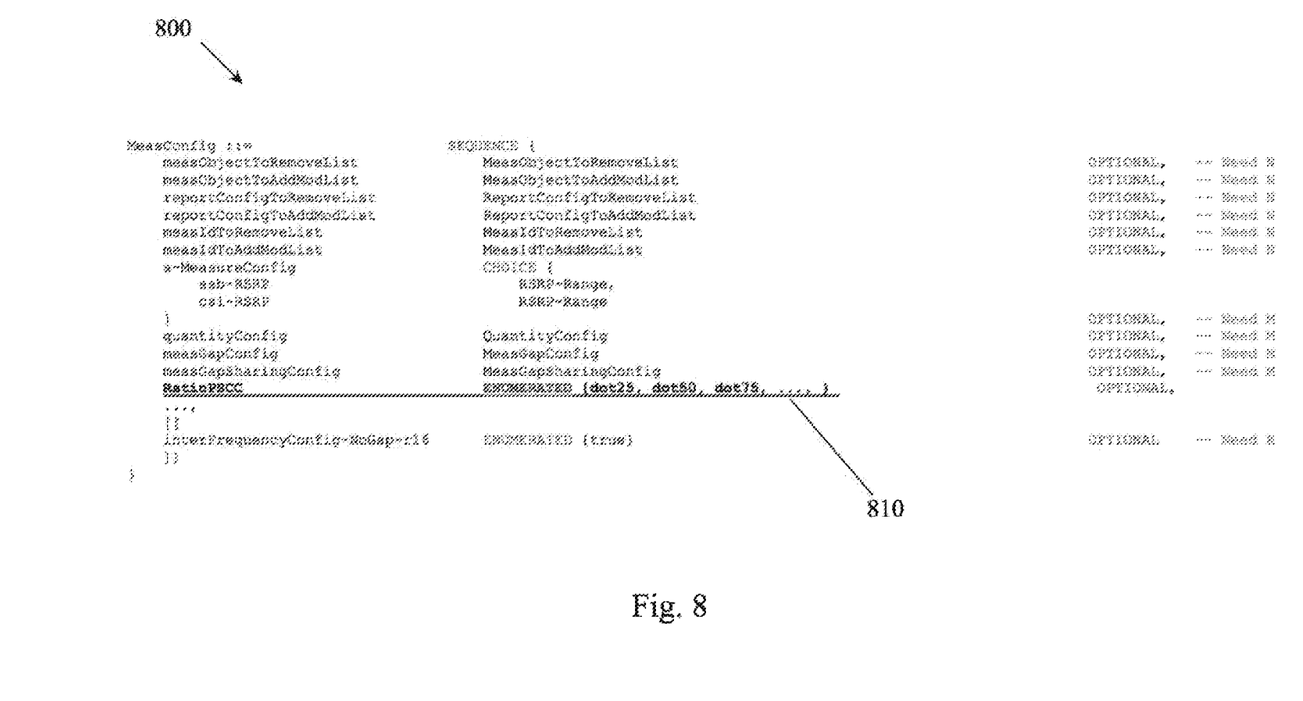
FIG. 8 shows an example of a MeasConfig Information Element (IE) that includes the prioritization information according to various exemplary embodiments.

As described above, the prioritization of the PSCell measurements over the SCell measurements may be signaled to the UE via new signaling. FIG. 8 shows an example of a MeasConfig Information Element (IE) 800 that includes the prioritization information according to various exemplary embodiments. As shown in FIG. 8, a new parameter RatioPSCC 810 may be added to the MeasConfig 1E 800 to signal the prioritization information. In this example, the prioritization factor is limited to the enumerated list of dot25, dot50, dot75 (e.g., 25%, 50%, 75%, respectively). However, this is only exemplary as other values of the prioritization factor may be used.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above-described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
    a transceiver configured to simultaneously connect to a primary cell (PCell) serving a primary component carrier (PCC), a primary secondary cell (PSCell) serving a primary secondary component carrier (PSCC) and at least one secondary cell (SCell) serving a secondary component carrier (SCC), wherein the PSCell is in a deactivated state; and
    a processor communicatively coupled to the transceiver and configured to perform operations comprising:
        receiving a radio resource management (RRM) measurement configuration comprising a PCC measurement object (MO) configuration, a PSCC MO configuration, and an SCC MO configuration;
        determining a PCC MO carrier specific scaling factor (CSSF), a PSCC MO CSSF, and an SCC MO CSSF, wherein the PSCC MO CSSF and the SCC MO CSSF results in a searcher being split evenly among the PSCC and the SCC; and
        applying each respective CSSF to a measurement period corresponding to each of the PCC MO, the PSCC MO, and the SCC MO.

2. The UE of claim 1, wherein the SCell comprises a plurality of SCells each serving at least one SCC and each SCC having an SCC MO CSSF.

3. The UE of claim 1, wherein the RRM measurement configuration comprises a PSCell prioritization factor, wherein the PSCC MO CSSF and the SCC MO CSSF are determined based on at least the PSCell prioritization factor.

4. The UE of claim 3, wherein the PSCell prioritization factor represents a ratio of a searcher allocation for the PSCell and the SCell.

5. The UE of claim 4, wherein the PSCC MO CSSF and the SCC MO CSSF are determined based on a respective function of the ratio of the searcher allocation for the PSCell and the SCell.

6. The UE of claim 5, wherein the SCC is served in either FR1 or FR2.

7. The UE of claim 3, wherein the PSCell prioritization factor is signaled via a MeasConfig Information Element (IE).

8. The UE of claim 1, wherein the PCC is served in frequency range 1 (FR1) and the PSCC is served in frequency range 2 (FR2).

9. A processor of a user equipment (UE), wherein the UE is configured to simultaneously connect to a primary cell (PCell) serving a primary component carrier (PCC), a primary secondary cell (PSCell) serving a primary secondary component carrier (PSCC) and at least one secondary cell (SCell) serving a secondary component carrier (SCC), wherein the PSCell is in a deactivated state, the processor configured to perform operations comprising:
receiving a radio resource management (RRM) measurement configuration comprising a PCC measurement object (MO) configuration, a PSCC MO configuration, and an SCC MO configuration;
determining a PCC MO carrier specific scaling factor (CSSF), a PSCC MO CSSF, and an SCC MO CSSF, wherein the PSCC MO CSSF and the SCC MO CSSF results in a searcher being split evenly among the PSCC and the SCC; and
applying each respective CSSF to a measurement period corresponding to each of the PCC MO, the PSCC MO, and the SCC MO.

10. The processor of claim 9, wherein the RRM measurement configuration comprises a PSCell prioritization factor, wherein the PSCC MO CSSF and the SCC MO CSSF are determined based on at least the PSCell prioritization factor, wherein the PSCell prioritization factor represents a ratio of a searcher allocation for the PSCell and the SCell.

11. The processor of claim 10, wherein the PSCell prioritization factor is signaled via a MeasConfig Information Element (IE).

12. The processor of claim 9, wherein the PCC is served in frequency range 1 (FR1) and the PSCC is served in frequency range 2 (FR2).

13. The processor of claim 12, wherein the SCC is served in either FR1 or FR2.

14. A base station, comprising:
a transceiver configured to communicate with a user equipment (UE) that is simultaneously connected to a primary cell (PCell) serving a primary component carrier (PCC), a primary secondary cell (PSCell) serving a primary secondary component carrier (PSCC) and at least one secondary cell (SCell) serving a secondary component carrier (SCC), wherein the PSCell is in a deactivated state; and
a processor communicatively coupled to the transceiver and configured to perform operations comprising:
transmitting, to the UE, a radio resource management (RRM) measurement configuration comprising a PCC measurement object (MO) configuration, a PSCC MO configuration, and an SCC MO configuration, wherein the RRM measurement configuration includes information allowing the UE to determine a PCC MO carrier specific scaling factor (CSSF), a PSCC MO CSSF, and an SCC MO CSSF, wherein the PSCC MO CSSF and the SCC MO CSSF results in a searcher being split evenly among the PSCC and the SCC.

15. The base station of claim 14, wherein the RRM measurement configuration comprises a PSCell prioritization factor, wherein the PSCC MO CSSF and the SCC MO CSSF are determined based on at least the PSCell prioritization factor.

16. The base station of claim 15, wherein the PSCell prioritization factor represents a ratio of a searcher allocation for the PSCell and the SCell.

17. The base station of claim 16, wherein the PSCC MO CSSF and the SCC MO CSSF are determined based on a respective function of the ratio of the searcher allocation for the PSCell and the SCell.

18. The base station of claim 15, wherein the PSCell prioritization factor is signaled via a MeasConfig Information Element (IE).

19. The base station of claim 14, wherein the PCC is served in frequency range 1 (FR1) and the PSCC is served in frequency range 2 (FR2).

20. The base station of claim 19, wherein the SCC is served in either FR1 or FR2.

\* \* \* \* \*